Dec. 10, 1957 W. H. LOHANS 2,815,798
BODY SUPPORTING MEMBER
Filed Jan. 31, 1955 2 Sheets-Sheet 1
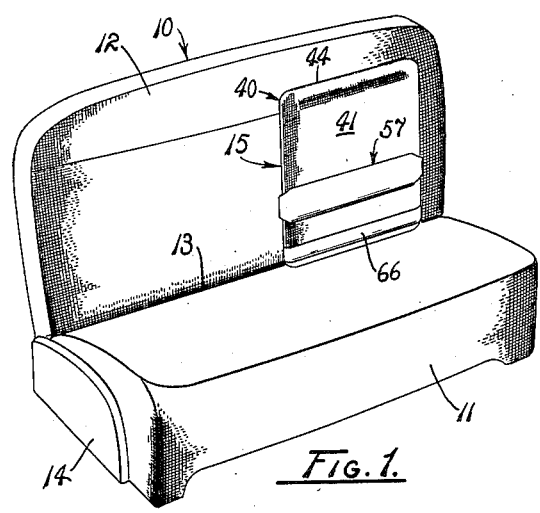
Fig. 1.
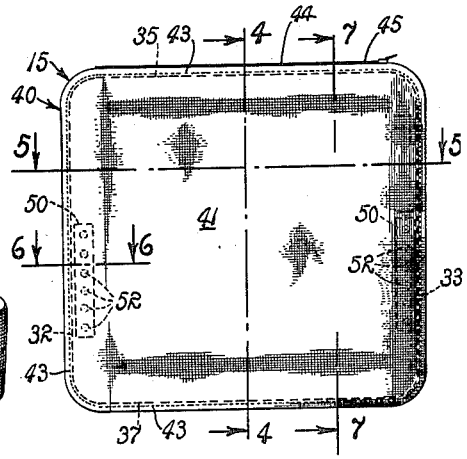
Fig. 2.
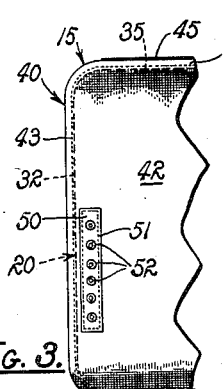
Fig. 3.
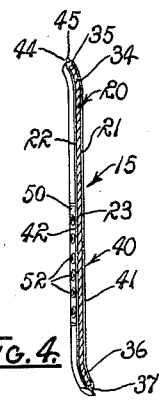
Fig. 4.
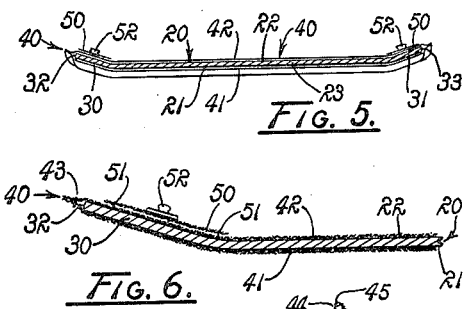
Fig. 5.
Fig. 6.
Fig. 7.
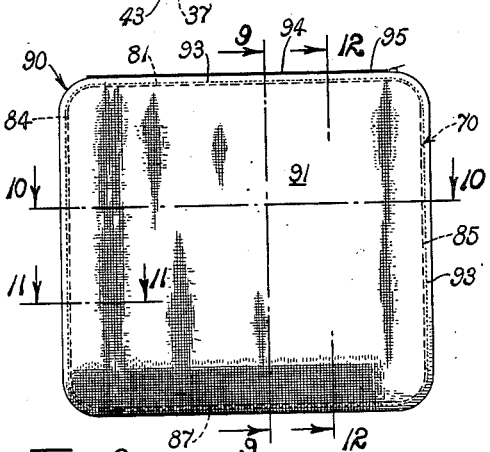
Fig. 8.
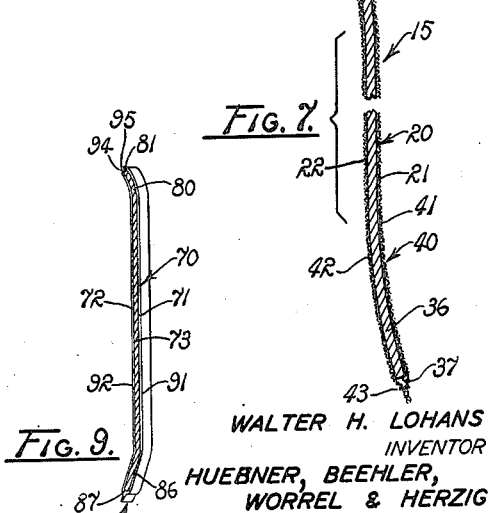
Fig. 9.
WALTER H. LOHANS
INVENTOR
HUEBNER, BEEHLER,
WORREL & HERZIG
ATTORNEYS
BY Richard M. Worrel

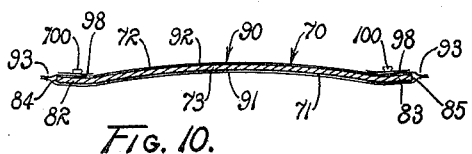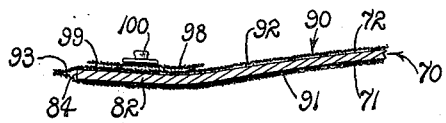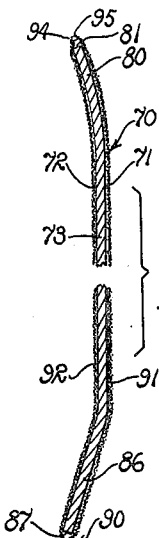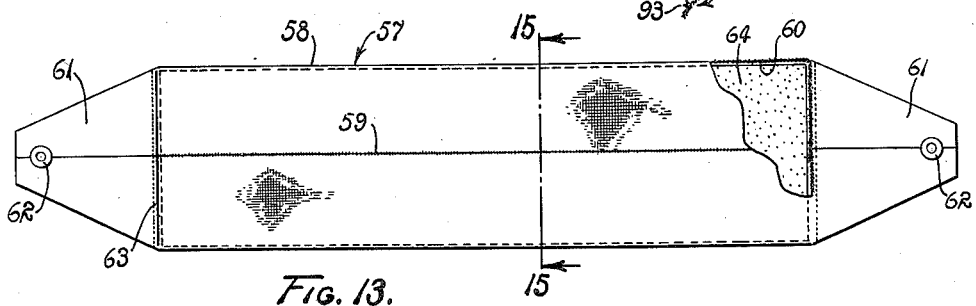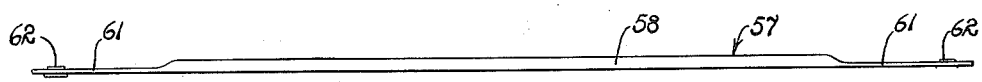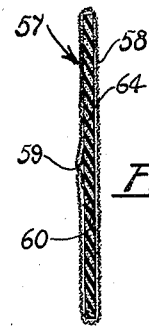
WALTER H. LOHANS
INVENTOR
HUEBNER, BEEHLER,
WORREL & HERZIG
ATTORNEYS

United States Patent Office 2,815,798
Patented Dec. 10, 1957

2,815,798

BODY SUPPORTING MEMBER

Walter H. Lohans, Reedley, Calif.

Application January 31, 1955, Serial No. 485,166

5 Claims. (Cl. 155—182)

The present invention relates to body supporting members and more particularly to an auxiliary back rest adapted for use with seats, seat cushions, chairs, lounges and the like and having especially advantageous application to automobile seats.

It is well known that individual physical differences require correspondingly individualized chairs, seats and similar supports if optimum comfort is to be attained. This problem is overcome to a large degree insofar as household furniture is concerned because the variety of forms and shapes available permits selection to suit customer preferences.

In automotive vehicles, however, almost no selection is possible. The seats usually conform to a predetermined shape intended to provide comfort for the average occupant of the vehicle but make no allowance for individual preferences except for minor elevational and forward and rearward adjustments. As a result, needless discomfort and fatigue are experienced not only by the passengers but by the drivers, as well. The relationship of driver fatigue to safety is well known and it is sufficient to observe that comfort and safety considerations are compatible and can be jointly benefitted.

It has been found that the portion of the body most frequently requiring auxiliary support is the back. Since many people find the lower cushions of automobiles too long from front to back or find it necessary to sit continually on the edge of the seat to drive properly, the back fails to receive the needed support. Thus, especially over long trips, the back becomes tired and soon results in general body fatigue.

Again, many seats are too soft to suit individual preference and auxiliary support is needed. Additionally, long contact with certain types of seat upholstery on warm days cause accumulated perspiration, further adding to the driver's or passenger's discomfort.

Back rests are known which are intended to provide auxiliary support of the general type above described but they have been lacking in several respects. Generally, no supports are available which provide optimum orthopedic support. Further, the known supports have been lacking in the desired adjustability, simplicity, durability, and economy of construction. It is with these desired attributes in mind that the present invention was developed.

Accordingly, an object of the present invention is to provide an improved supporting structure for the back.

Another object is to relieve fatigue while riding in a vehicle incident to improper and/or inadequate support of the back.

Another object is to provide a back rest having an improved back receiving and supporting surface.

Another object is to provide a back rest for use with seat cushions and the like having a back receiving area of resilient nature which is held rigidly in spaced relation from one of the seat cushions.

Another object is to provide a back rest generally having a construction to support the entire area of the back but further including localized support for the back which is adjustably positionable.

Another object is to provide a back rest having a removable cover adapted releasably to mount a localized back support thereon.

Other objects are to provide a back rest which is durable in construction, light in weight, simple and economical to make, adapted for use in association with seats of many forms and fully effective in accomplishing its intended purposes.

These and other objects will become more fully apparent upon reference to the following description.

In the drawings:

Fig. 1 is a perspective view of an automobile seat showing a back rest constructed in accordance with the principles of the present invention positioned thereon and including an adjustable back pad and a base pad.

Fig. 2 is a front elevation of the panel and cover therefor employed in the back rest of Fig. 1 but with the back and base pads removed.

Fig. 3 is a fragmentary rear elevation of the panel and cover of Fig. 2.

Fig. 4 is a vertical section taken on line 4—4 of Fig. 2.

Fig. 5 is a horizontal section taken on line 5—5 of Fig. 2.

Fig. 6 is a somewhat enlarged fragmentary horizontal section taken on line 6—6 of Fig. 2.

Fig. 7 is a somewhat enlarged vertical section taken on line 7—7 of Fig. 2 and with the central portion broken away for illustrative convenience.

Fig. 8 is a front elevation of a panel and cover therefor as provided in a second form of the present invention.

Fig. 9 is a vertical section taken on line 9—9 of Fig. 8.

Fig. 10 is a horizontal section taken on line 10—10 of Fig. 8.

Fig. 11 is a somewhat enlarged fragmentary horizontal section taken on line 11—11 of Fig. 8.

Fig. 12 is a somewhat enlarged vertical cross section taken on line 12—12 of Fig. 8 partially broken away in a manner similar to Fig. 7.

Fig. 13 is a somewhat enlarged rear view of the back pad employed with the back rest of the present invention and previously shown in association therewith in Fig. 1.

Fig. 14 is a lateral edge view of the back pad of Fig. 13.

Fig. 15 is a somewhat enlarged transverse section taken on line 15—15 of Fig. 13.

Referring more particularly to the drawings:

A seat 10, such as that employed in an automotive vehicle, not shown, is illustrated in Fig. 1 and includes a substantially horizontally disposed bottom cushion 11 a back cushion 12 upwardly extended from the bottom cushion defining therebetween an elongated crevice 13. The seat is mounted in a support frame 14. A back rest 15, constructed in accordance with the principles of this invention, is shown in position on the seat in a manner to be more particularly described.

The back rest 15 includes a substantially rectangular panel 20 of somewhat rigid, resilient material. For this purpose, a plastic board reinforced with fiberglass and/or cotton stockinette has been found to be suitable. Obviously any other suitable material or materials may be utilized. The panel has front and rear sides 21 and 22, respectively, and provides a central back supporting or receiving portion 23 of relatively large area insofar as the total area of the panel is concerned. The central portion, in the first form of the invention, is substantially flat throughout as best seen in Figs. 4 and 5 of the drawings.

The panel 20 provides substantially straight, relatively narrow, lateral or marginal flanges 30 and 31, respectively, rearwardly extended from the central portion 23 in substantially obtuse abrupt angularity therewith, as seen in Fig. 6, and terminating in lateral edges 32 and 33, respectively. An upper arcuate marginal flange 34 is rearwardly extended from the central portion along a smooth curve or transition therefrom, as seen in Fig. 4, and terminates in an upper edge 35. A lower arcuate marginal flange 36 is extended forwardly of the central portion along a smooth curvature substantially the same as that of the upper flange and terminates in a lower edge 37. The vertical cross section of the panel, therefore, approximates an S-shape wherein the central portion thereof is elongated and substantially straight, again as best seen in Figs. 4 and 5. It should be noted that the upper and lower flanges 34 and 36 extend from the central portion 23 along smooth curves whereas the lateral flanges 30 and 31 extend from the central portion in abrupt angular relation therewith.

A cover or jacket 40 of any suitable material such as leather, cloth, or other fabric, is provided for enclosing the panel 20 and includes front and rear sheets 41 and 42 peripherally joined by stitching 43. The cover provides an opening or slot 44 and a slide fastener or the like 45 is attached to the cover along the slit for opening and closing the slit. The cover 40 is fitted on the panel by inserting the panel in the slit in such a manner that the front sheet of the cover is adjacent to the front side 21 of the panel and the rear sheet of the cover is adjacent to the rear side 22 of the panel. The fastener, of course, is then closed to retain the panel within the cover.

A pair of mounting strips 50 of material similar to that of the cover 40 are sewn or otherwise attached to the rear sheet 42 of the cover by stitching 51 adjacent to opposite lateral edges of said sheet. In this position the strips also overlie the lateral flanges 30 and 31 of the panel 20. Each strip is provided with a plurality of male snap fastener members 52 attached in vertical spaced relation therealong and transversely aligned with corresponding male fastener members mounted on the strip adjacent to the opposite lateral edge of the cover.

Referring to Figs. 1 and 13 to 15, there is illustrated a back pad 57 as employed with the back rest 15 of the present invention. The back pad includes an elongated envelope or cover 58 formed from a sheet of material, preferably cloth, leather or other fabric, folded around with the edges attached along a seam 59 and defining an elongated pocket 60 therein. The envelope further provides a pair of end flaps 61 endwardly extended therefrom and mounting female snap fastener members 62 at the outer ends thereof. The envelope has a slit 63 therein opening into the pocket. A filler member 64 of flexible resiliently compressible material, such as foam rubber, felt, or the like is inserted in the pocket. It is to be understood that the back pad could be of any desirable shape to suit the comfort, convenience and proper support of the user's back. For example, circular, oval, square, irregular, contoured and many other forms may be employed.

The back pad 57 is positioned on the front sheet 41 of the cover 40 with seam 59 against the cover and with flaps 61 folded around the lateral edges of the cover for engagement of the female fastener members 62 on the flaps with correspondingly vertically positioned male fastener members 52 on the cover. The back pad is therefore positioned on the front of the panel 20 intermediate the upper and lower edges 35 and 37 and is stretched between the lateral edges 32 and 33.

Alternatively, the back pad 57 may be attached to the front sheet 41 by providing fastener members, not shown, thereon and by shortening the length of the flaps 61. However, the back pad may be attached to the cover in any convenient and effective manner as will be apparent.

A base pad 66 is shown only in Fig. 1 and is optionally employable interiorly or exteriorly of the front sheet 41 of the cover 40 in overlying relation to the lower marginal flange 36 of the panel 20. It may be constructed and attached exteriorly of the cover in the same manner as back pad 57 or it may be bonded permanently to the panel interiorly of the cover, the latter possibility being not shown in the drawings.

Operation

The operation and utility of the present invention is believed to be readily apparent and is briefly summarized at this point.

With the panel 20 inserted in the cover 40 and the back pad 57 attached to the cover in the manner above described, the back rest is positioned in upright attitude against the back cushion 12 of the seat 10. When properly in position, the upper edge 35 and the lateral edges 32 and 33 bear against the back cushion 12 and the lower edge 37 rests on the bottom cushion 11 forwardly adjacent to the crevice 13 between the cushions. The extended flanges 30, 31, 34 and 36 impart marginal rigidity to the panel and resiliency to the central portion 23 of the panel inasmuch as the latter is supported in spaced relation to the back cushion.

It is especially to be noted that since the lateral flanges 30 and 31 extend in abrupt angularity from the central portions, the panel has transverse rigidity and will, therefore, resist bending or collapse around a horizontal axis, as viewed in Fig. 1. The rearward smooth curvature of the upper flange 34, however, aids in supporting the central portion in spaced relation to the back cushion and permits limited flexing movement of the central portion while imparting some rigidity to the upper edge. The forwardly curved lower flange 36 is adapted to place upward pressure on the dorsal areas of the user. Increasing or decreasing the thickness of the base pad 66 may be necessary properly to accommodate various users or it may be completely removed, if desired.

The back pad 57 may be adjusted vertically by selected engagement of the female fastener members 62 with selected ones of the male fastener members 52 thereby enabling individual adjustment to provide proper sacral support, as needed.

The cover 40 on the panel 20 may easily be removed for washing or replacement purposes and likewise, the envelope 58 for the back pad may be removed from the filler 64 to permit washing or replacement.

Second form

A second form of the invention is shown in Figs. 8 to 12, inclusive. As before, the second form provides a substantially rectangular panel 70 having front and rear portions 71 and 72, respectively and a central body supporting portion 73. However, the central portion of panel 70 is rearwardly transversely concave, as best seen in Fig. 10 thereby being somewhat more closely contoured to the form of the user's back.

The panel 70 further provides an upper arcuate marginal flange 80 rearwardly extended from the central portion having a smooth curvature terminating in an upper edge 81. A pair of substantially straight lateral or marginal flanges 82 and 83 are extended rearwardly from the central portion and terminate in lateral edges 84 and 85, respectively. The lateral flanges are in abrupt angular relationship with the central portion as are the flanges 30 and 31 of the first form of the invention. A lower marginal flange 86 is extended rearwardly from the central portion in abrupt angular relation similar to the lateral flanges 82 and 83, as best seen in Fig. 12 and terminates in a lower edge 87.

A cover 90 is fitted around the panel 70 having front and rear sheets 91 and 92 joined along a peripheral seam 93 and providing a slit 94 along one edge thereof. A slide fastener 95 is provided on the cover along the slit for opening and closing the same.

Strips 98 are attached by suitable stitches 99 on the rear sheet 92 of the cover adjacent to the lateral flanges 82 and 83 of the panel 70 as before. Male snap fastener members 100 are also attached in vertically spaced positions along the strips.

Inasmuch as the back pad 57 is adapted for use with either form of the invention, further description of the pad in association with the second form of the invention is not believed necessary.

The use of the second form of the invention is similar to that first described, that is, it is positioned in upright attitude on the seat 10 with the lateral and upper and lower edges 82, 83, 81 and 87 against the back cushion 12. It is to be noted, however, that this form is preferred by those who desire the contouring or curvature of the central portion 73 to fit more closely the shape of the back. As before, the angularity of the lateral flanges 82 and 83 imparts marginal rigidity to the panel while the curved upper flange permits the desired flexibility of the central portion. The rearwardly bent lower flange 86 aids in supporting the panel in spaced relation to the back cushion and likewise imparts rigidity thereto. Rearward extension of the lower flange is preferred by users not requiring any dorsal support or finding such uncomfortable when provided. However, it is to be understood that flange 86 can be curved forwardly in the manner of flange 36 of the form of the invention in Figs. 1–7 if dorsal support is needed. Likewise, the flange 36 can be rearwardly angulated like flange 86 if dorsal support is not desired in the form of Figs. 1–7.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure Letters Patent is:

1. A back rest comprising a solid one-piece panel of resilient material having front and rear sides and providing a central back receiving portion of relatively large area, an upper marginal flange integrally rearwardly extended from the back receiving portion, opposed lateral flanges integrally rearwardly extended from the back receiving portion, and a lower edge said flanges being adapted to impart marginal rigidity and central resiliency to the panel, a cover fitted over the panel providing front and rear sheet portions adjacent to the front and rear sides of the panel, a back support pad, means releasably interconnecting the back support pad and the cover mounting the back support pad over the back receiving portion of the panel, a base support pad, and means mounting the base support pad along the front side of the panel adjacent to the lower edge thereof.

2. A back rest adapted for use in association with a seat having an upwardly extended back cushion comprising: a panel of resilient material having front and rear sides and providing a relatively large central back supporting portion, relatively narrow lateral flanges rearwardly angularly extended from the central portion and terminating in opposed lateral edges adapted to bear against the back cushion thereby to position the central portion in spaced relation to the back cushion, a relatively narrow upper flange rearwardly extended from the central portion terminating in an upper edge also adapted to bear against the back cushion, a relatively narrow lower flange extended from the central portion terminating in a lower edge; a cover enclosing the panel having a back sheet adjacent to the back side of the panel and a front sheet adjacent to the front side of the panel; fastening members secured to the cover and a back pad extended across the front side of the panel providing fastening members thereon adapted to engage the fastening members on the cover.

3. A back rest adapted for use in association with a seat having a substantially horizontally disposed bottom cushion and a back cushion upwardly extended therefrom comprising; a substantially rectangular panel of resilient material having front and rear sides and providing a relatively large central back supporting portion, substantially straight relatively narrow lateral flanges rearwardly angularly extended from the central portion and terminating in opposed lateral edges adapted to bear against the back cushion thereby to position the central portion in spaced relation to the back cushion, a relatively narrow upper arcuate flange rearwardly extended from the central portion terminating in an upper edge also adapted to bear against the back cushion, a relatively narrow lower arcuate flange forwardly extended from the central portion terminating in a lower edge adapted to rest on the bottom cushion; a cover of fabric material enclosing the panel having a back sheet adjacent to the back side of the panel and a front sheet adjacent to the front side of the panel; opposed fastening members secured to the back sheet adjacent to the lateral flanges of the panel; a back pad including an envelope having a pair of endwardly extended flaps providing fastening members thereon adapted to engage the fastening members on the cover thereby to position the envelope on the front panel intermediate the upper and lower edges and the lateral edges, and a resiliently compressible filler member in the envelope; and a base pad positioned along the front side of the lower flange.

4. A back rest adapted for use in association with a seat having an upwardly extended back cushion comprising; a substantially rectangular panel of resilient material having front and rear sides and providing a relatively large central back supporting portion, substantially straight relatively narrow lateral flanges rearwardly angularly extended from the central portion and terminating in opposed lateral edges adapted to bear against the back cushion thereby to position the central portion in spaced relation to the back cushion, a relatively narrow upper arcuate flange rearwardly extended from the central portion terminating in an upper edge also adapted to bear against the back cushion, a relatively narrow lower flange rearwardly extended from the central portion terminating in a lower edge; a cover enclosing the panel having a back sheet adjacent to the back side of the panel and a front sheet adjacent to the front side of the panel; fastening members secured to the cover adjacent to the lateral flanges of the panel vertically spaced along each lateral flange; and a back pad positioned on the front side of the panel providing fastening members thereon adapted to engage the fastening members on the cover.

5. A back rest for use on a seat having a bottom cushion and a back cushion comprising a solid one-piece panel of resilient sheet material having front and rear sides, a large central resilient back-receiving portion, integral upper and lateral marginal flanges relatively smaller in area than the back-receiving portion and rearwardly extended therefrom for engagement with the back cushion of a seat to support the back-receiving portion in spaced relation to the back cushion and to impart marginal rigidity and central resiliency to the panel, and an integral lower marginal flange extended from the back-receiving portion for engagement with the bottom cushion of a seat to support the panel in position against the back cushion of the seat.

References Cited in the file of this patent

UNITED STATES PATENTS

| | | |
|---|---|---|
| 1,419,006 | Barrett | June 6, 1922 |
| 1,422,915 | Benson et al. | July 18, 1922 |
| 2,059,597 | Okano | Nov. 3, 1936 |

FOREIGN PATENTS

| | | |
|---|---|---|
| 22,196 | Australia | Feb. 21, 1930 |
| 439,033 | Great Britain | Nov. 28, 1935 |